US008392583B2

(12) United States Patent
Bijwaard et al.

(10) Patent No.: US 8,392,583 B2
(45) Date of Patent: Mar. 5, 2013

(54) DISTRIBUTION OF SHARED CONTENT STREAMS IN COMMUNICATIONS NETWORKS

(75) Inventors: Dennis Bijwaard, Enschede (NL); Harold Teunissen, Deventer (NL)

(73) Assignee: Alcatel Lucent, Paris (FR)

( * ) Notice: Subject to any disclaimer, the term of this patent is extended or adjusted under 35 U.S.C. 154(b) by 322 days.

(21) Appl. No.: 12/733,657

(22) PCT Filed: Oct. 20, 2008

(86) PCT No.: PCT/EP2008/064144
§ 371 (c)(1),
(2), (4) Date: Mar. 12, 2010

(87) PCT Pub. No.: WO2009/053336
PCT Pub. Date: Apr. 30, 2009

(65) Prior Publication Data
US 2010/0211689 A1 Aug. 19, 2010

(30) Foreign Application Priority Data
Oct. 25, 2007 (EP) .................................... 07301494

(51) Int. Cl.
G06F 15/16 (2006.01)
H04N 7/173 (2011.01)
(52) U.S. Cl. ............. 709/227; 725/86; 725/87; 725/98; 725/101
(58) Field of Classification Search .................. 709/228, 709/227; 725/86, 87, 98, 101
See application file for complete search history.

(56) References Cited

U.S. PATENT DOCUMENTS

| 2002/0143852 | A1* | 10/2002 | Guo et al. | 709/201 |
| 2004/0229596 | A1* | 11/2004 | Stura et al. | 455/406 |
| 2005/0259584 | A1 | 11/2005 | Chen | |
| 2006/0291412 | A1 | 12/2006 | Naqvi | |
| 2007/0083899 | A1* | 4/2007 | Compton et al. | 725/87 |
| 2007/0160048 | A1 | 7/2007 | Faucheux | |
| 2008/0109853 | A1* | 5/2008 | Einarsson et al. | 725/62 |
| 2009/0055899 | A1* | 2/2009 | Deshpande et al. | 726/4 |

FOREIGN PATENT DOCUMENTS
EP 1806870 7/2007
WO WO 2005/117345 12/2005

* cited by examiner

Primary Examiner — Jeong S Park
(74) Attorney, Agent, or Firm — Harness, Dickey & Pierce, P.L.C.

(57) ABSTRACT

A method for controlling distribution of a content stream in a communications network, comprising the steps of:
storing session state information about existing communication sessions within the network,
receiving a request (15) for transmission of a content stream to a requesting network client (4),
determining that an existing session includes the requested content stream,
determining that a receiver (1) of said content stream in said existing session has a network location correlated with a network location of the requesting network client,
selecting a relay network element (5) capable of servicing said correlated network locations, and setting up at least one communication session for streaming said requested content stream to both the requesting network client (4) and said receiver (1) of the content stream in the existing session through the relay network element (5).

25 Claims, 7 Drawing Sheets

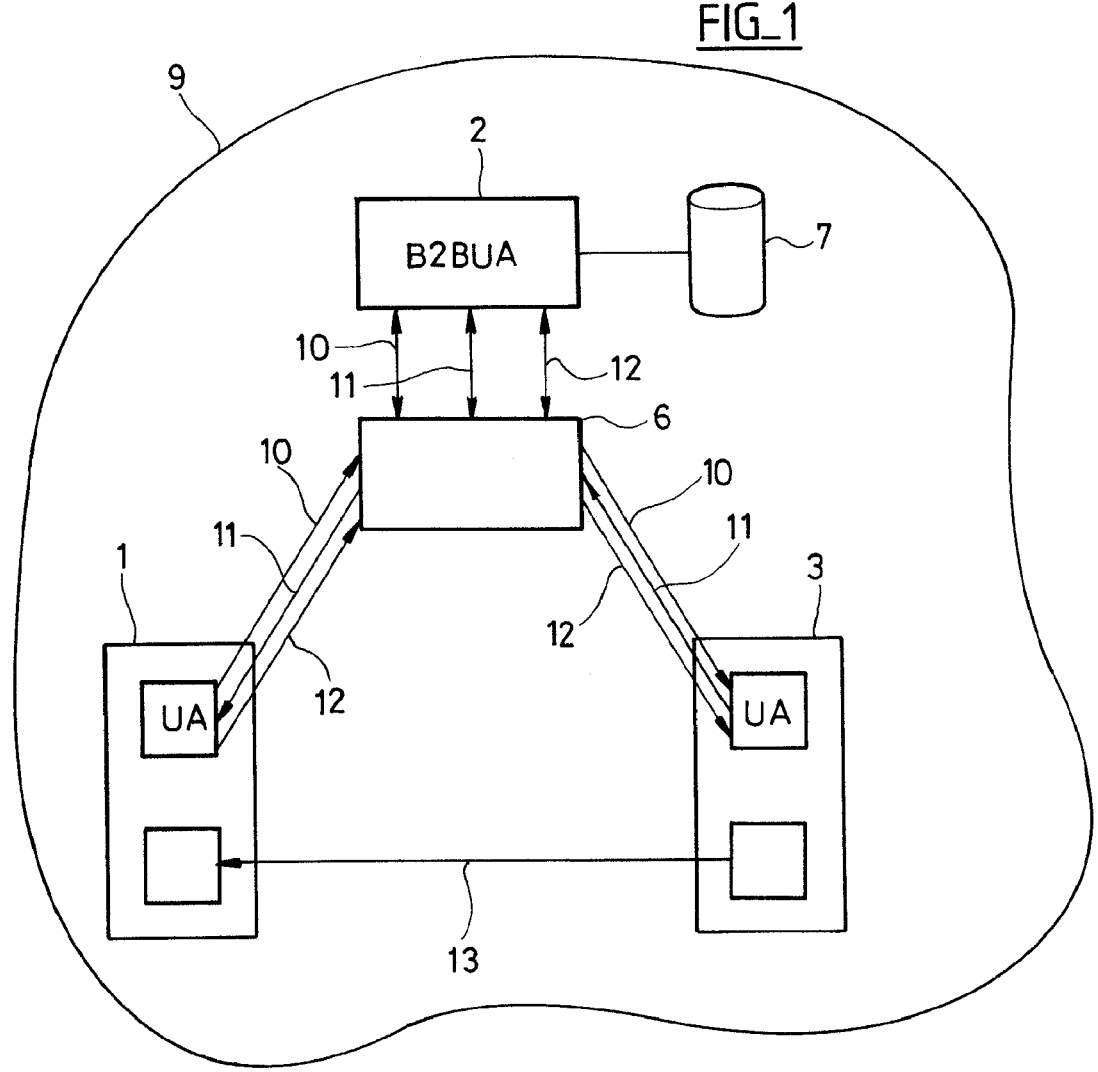
FIG_1
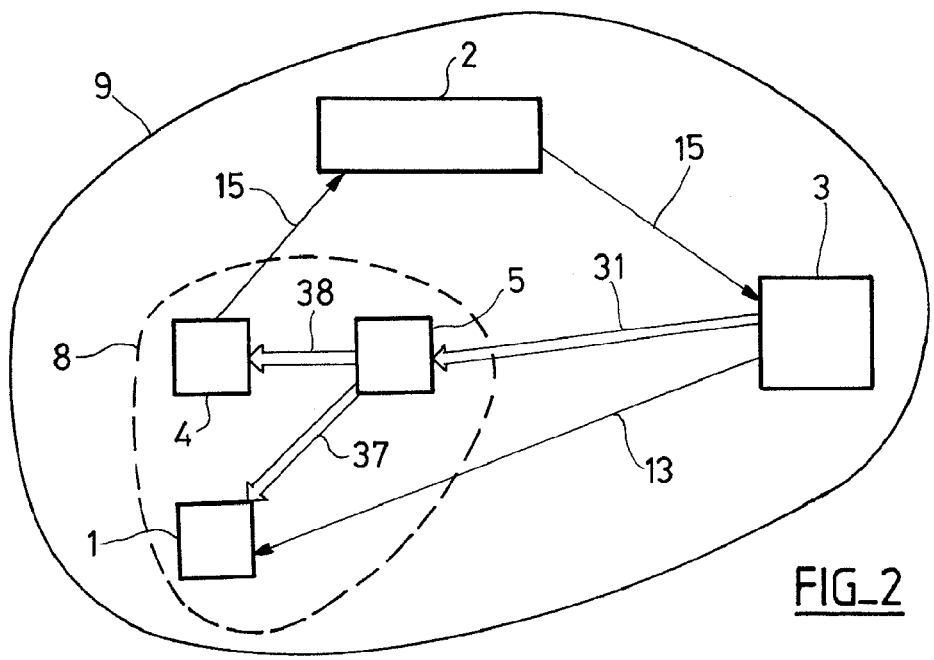
FIG_2

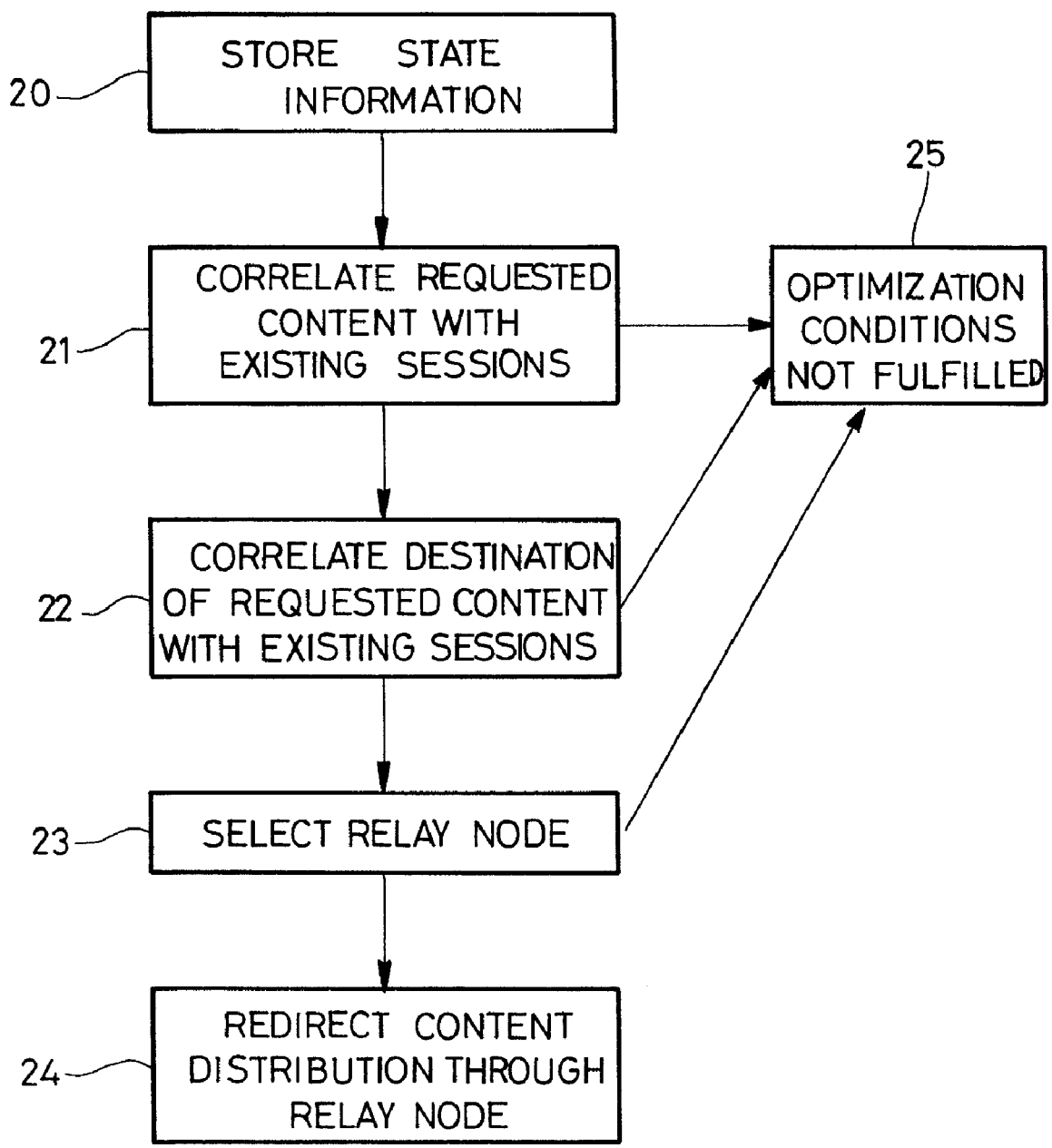
FIG_3

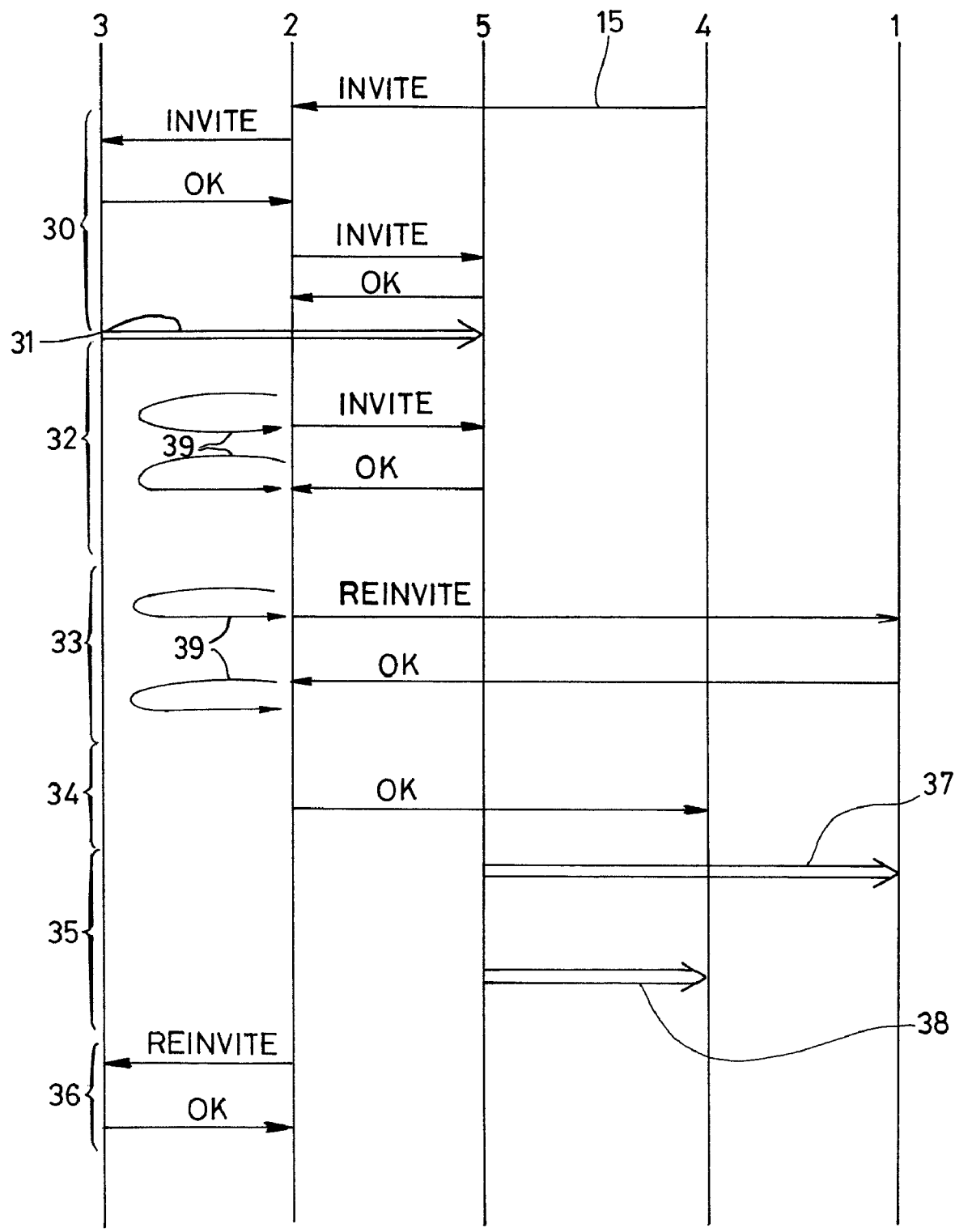
FIG_4

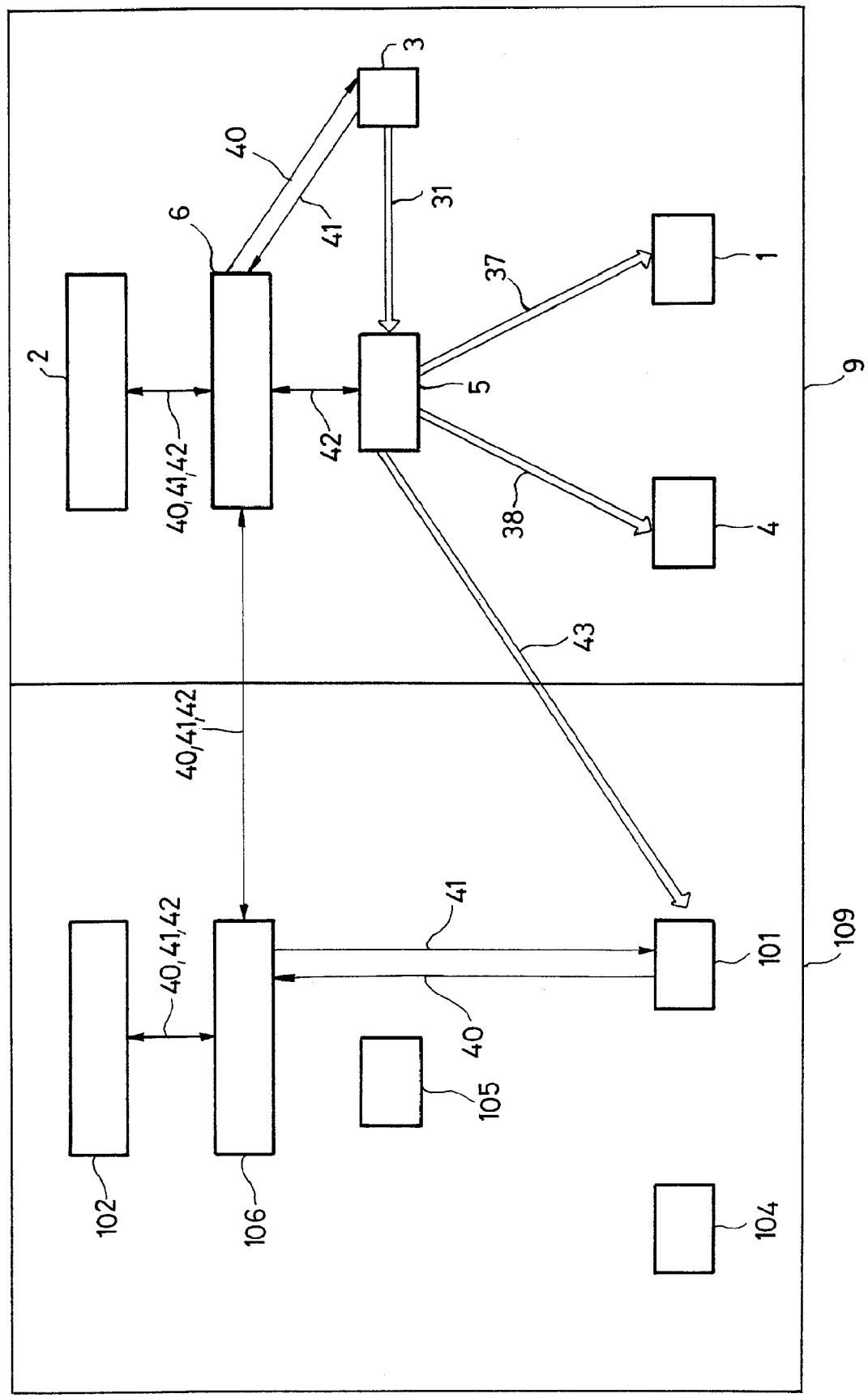

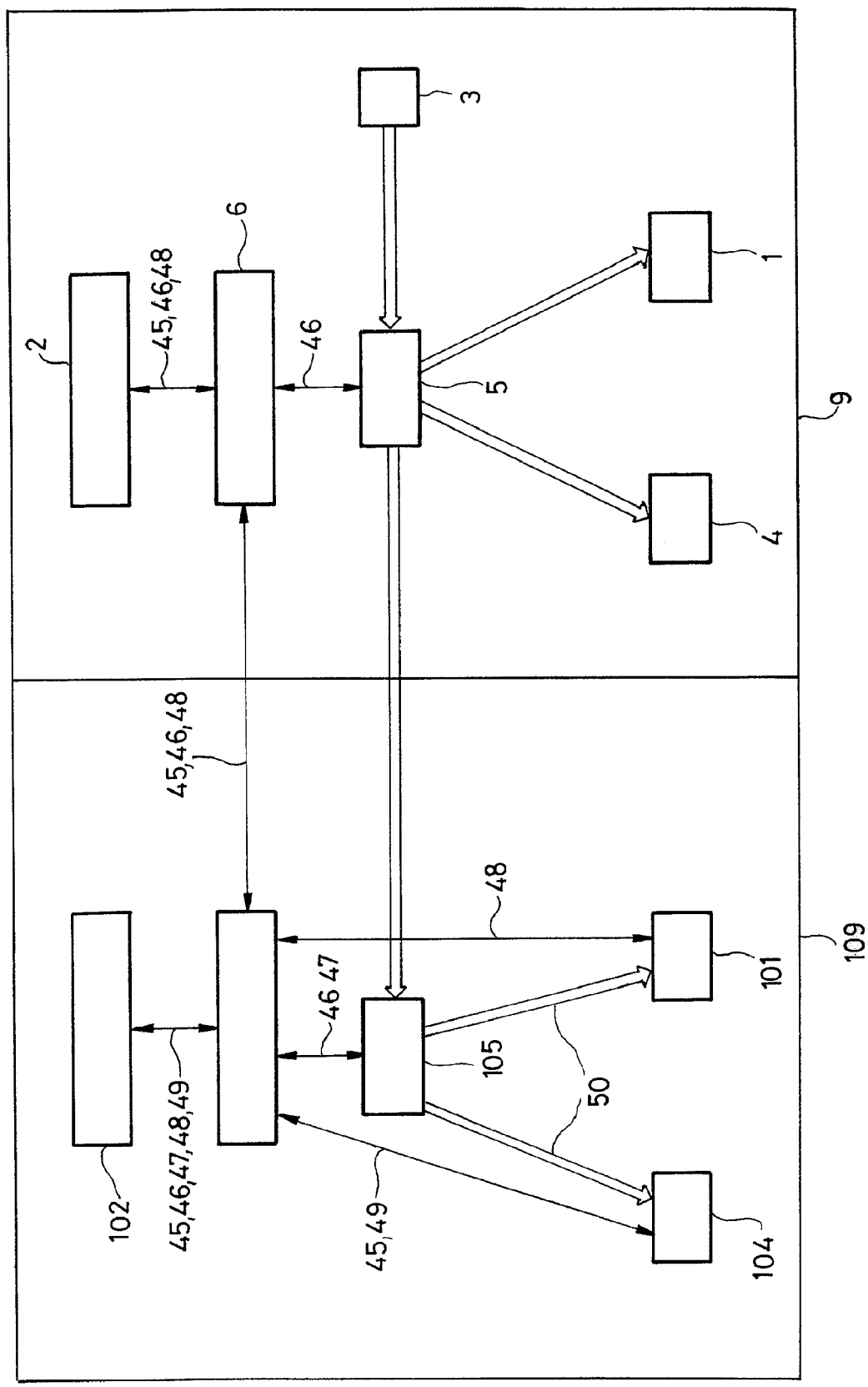
FIG_6

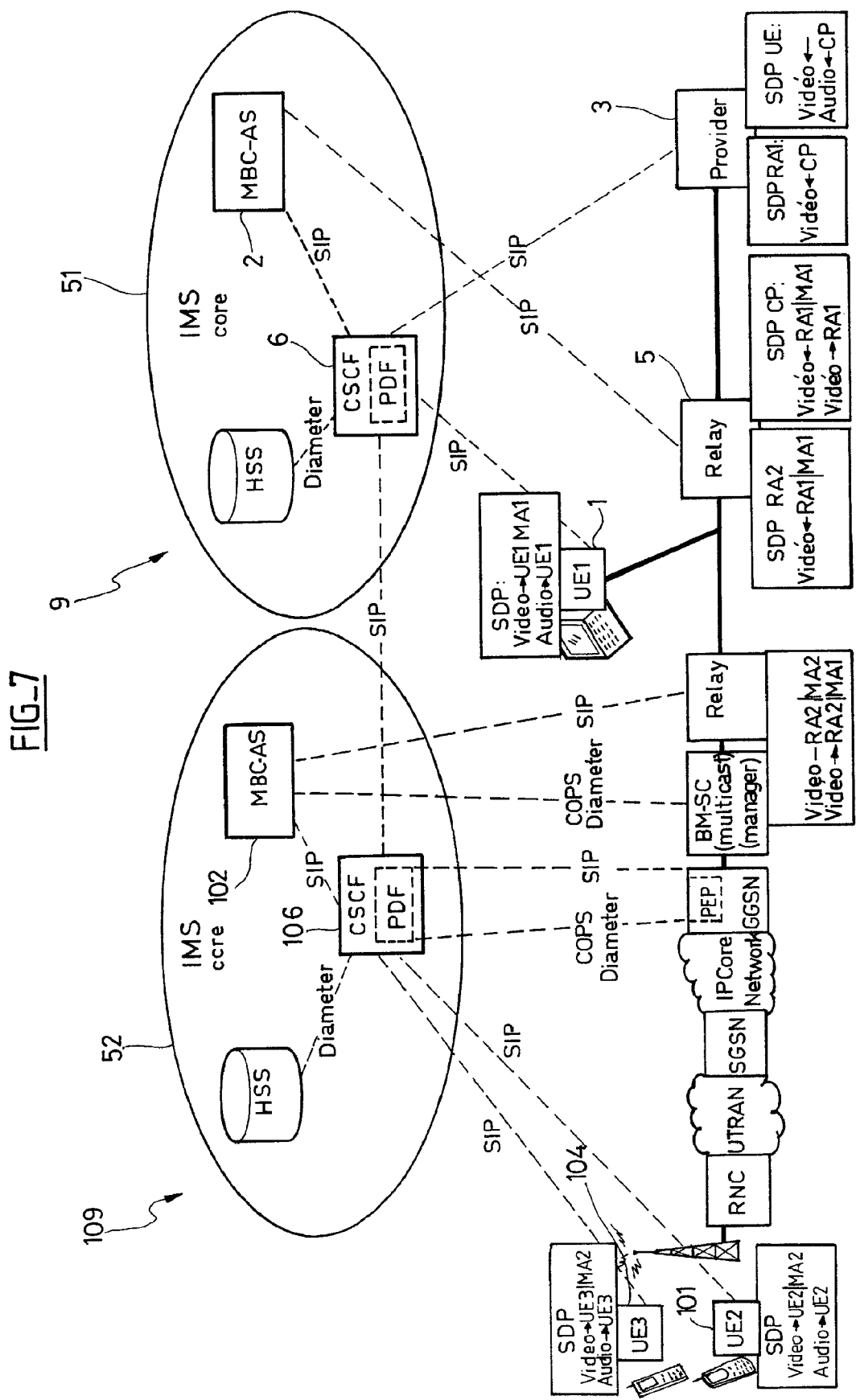
FIG_7

FIG_8
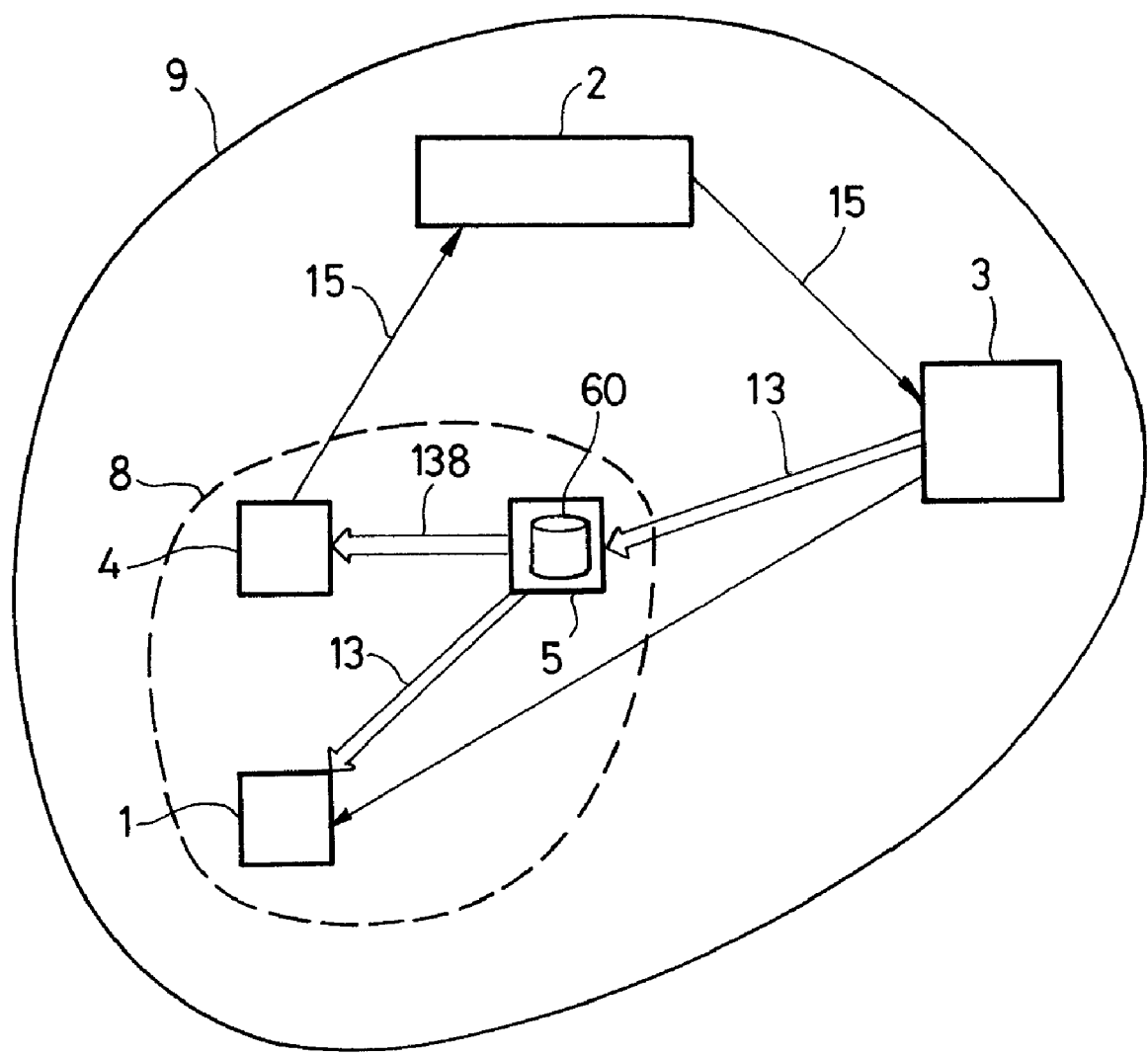

DISTRIBUTION OF SHARED CONTENT STREAMS IN COMMUNICATIONS NETWORKS

FIELD OF THE INVENTION

The invention relates to the technical field of streaming content distribution in communications networks.

BACKGROUND OF THE INVENTION

Services like telecommunication, messaging, radio/television broadcast, and web browsing are increasingly using the same IP based transport technology. Converged IP networks will eventually enable a blending of those services. At the same time, demand increases for a personalized user experience: e.g. enjoying your favorite content regardless of network access type, terminal, place or time.

A streaming content refers to a media or multimedia that is continuously received by, and normally displayed to, an end-user while a provider is delivering it over a communications network. Unicast protocols send a separate copy of the media stream from the provider to each end-user. This is simple, but can lead to massive duplication of data on the network. Multicast protocols undertake to send only one copy of the media stream over any given network connection, i.e. along the path between any two network routers. However, all network segments do not currently support IP Multicast.

SUMMARY OF THE INVENTION

It is an object of the invention to optimize content distribution efficiency in communications networks, especially in converged IP networks.

According to the invention, this object is achieved by a method for controlling distribution of one or more shared content streams in a communications network, comprising the steps of:
storing session state information about existing communication sessions within the network,
receiving a request for transmission of a content stream to a requesting network client,
determining that an existing session includes the requested content stream,
determining that a receiver of said content stream in said existing session has a network location correlated with a network location of the requesting network client, selecting a relay network element capable of servicing said correlated network locations, and
setting up one or more communication sessions for streaming said requested content stream to both the requesting network client and said receiver of the existing session through the relay network element.

The invention provides also a method for controlling distribution of a content stream in a communications network, comprising the steps of:
storing session state information about existing communication sessions within the network,
receiving a request for transmission of a content stream to a requesting network client,
determining that an existing session includes a relay network element that receives the requested content stream,
determining that the requesting network client has a network location correlated with a network location of the relay network element in said existing session, and
setting up at least one communication session for streaming said requested content stream to the requesting network client from the relay network element.

A receiver of the content stream in the existing session refers to any network element or network client that receives the content stream in the existing session, either an end point of the existing session e.g. a user terminal, or an intermediate point e.g. a relay node involved in the existing session. Hence, the selected relay network element may or may not have already been involved in the existing session. The step of setting up communication sessions may involve modifying existing sessions and/or creating new sessions.

In embodiments, the method further comprises the step of caching the requested content stream at the relay network element and/or the step of transcoding the requested content stream at the relay network element. In an embodiment, the relay carries out transcoding of the data stream from a codec used between a source of the content stream and the relay to a different codec used between the relay and the requesting network client.

In an embodiment, the method further comprises the step of selecting a transport protocol in a group of transport protocols supported by the network, said group comprising a unicast transport protocol and at least one of a multicast transport protocol and a broadcast transport protocol, said transport protocol being selected for streaming the requested content stream between the relay network element and both the requesting network client and the receiver of the existing session. Hence, where several transport techniques are available, the most appropriate transport technique can be selected depending on popularity of the content, number of receivers and the efficiency of each technique.

In a preferred embodiment, the Session Initiation Protocol (SIP) is used for setting up the communication sessions.

In embodiments, the step of determining correlated network locations may comprise determining that the requesting network client and the receiver of the existing session belong to a common IP subnet of said network, or determining that the requesting network client and the receiver of the existing session are at a short distance one from the other (e.g. in terms of number of network hops), or determining that the requesting network client and the receiver of the existing session are wireless terminals located in a common cell of a wireless system. Other topology information may be used as well to determine if a relay network element can efficiently serve both clients.

The invention provides also a streaming content distribution controller for a communications network comprising:
storage means for storing session state information about existing communication sessions within the network,
an interface for receiving a request for content from a network client,
content correlation means for identifying an existing session having a content stream correlated with a requested content stream,
network location correlation means for identifying a destination of said content stream in said existing session having a network location correlated with a network location of the requesting network client,
relay determination means for identifying a relay network element capable of servicing said correlated network locations, and
signaling means for setting up at least one communication session for streaming said requested content stream to both the requesting network client and said destination of the existing session through the relay network element.

In preferred embodiments, the content distribution controller may include one or several of the following features:

the signaling means uses the Session Initiation Protocol.

the signaling means includes a SIP B2BUA.

the network location correlation means is capable of determining that the requesting network client and the receiver of the existing session are at short distance or belong to a common segment of said network, e.g. a common IP subnet of said network or a common cell of a wireless system.

the relay determination means comprises a data storage including configuration information that associates each of a plurality of relay network elements to a respective segment of the network.

the relay determination means comprises a discovery interface for retrieving the identity of a relay network element associated to a network segment from a discovery server or registry.

the content correlation means is capable of detecting a URI associated to said content stream in both the request and the session state information of existing communication sessions.

the content correlation means is capable of detecting a media description parameter associated to said content stream in both the request and the session state information of existing communication sessions.

The invention provides also a communications network, comprising the streaming content distribution controller and a plurality of relay network elements for servicing respective segments of said network and at least one signaling proxy server configured to direct requests originating from clients of said communications network to the streaming content distribution controller.

In an embodiment, the communications network has an IP Multimedia Subsystem architecture.

In an embodiment, the communications network comprises a plurality of content distribution controllers in charge of different administrative domains of said network. For SIP, this controller can exist in each home network, e.g. as an Application Server tied to the S-CSCF in IMS.

The subclaims define further preferred embodiments of the invention.

An idea at the background of the invention is that SIP is particularly suited for setting up multimedia sessions, and can therefore be used to setup multimedia sessions to content providers, complementary to the web servers that are used nowadays. A big benefit of using SIP for setting up and controlling these sessions is the relative ease to modify content streams within them by exchanging updated SDP offers and answers, both by session endpoints and by B2BUAs in the signaling path. These modifications allow among others: changing a stream from unicast to IP multicast; changing the type of transmission to multihomed device and changing an endpoint of transmission.

The invention is based on the idea of using signaling (e.g. SIP) to bundle multiple unicast media streams that are destined to multiple network clients (or multiple requests for such streams), into a single stream sourcing from a single content provider to a network node located closer to those multiple clients. From the network node, the combined streams are dispatched again, i.e. either unicasted or multicasted, depending on the local network capabilities and other optimization criteria.

BRIEF DESCRIPTION OF THE DRAWINGS

These and other aspects of the invention will be apparent from and elucidated with reference to the embodiments described hereinafter, by way of example, with reference to the drawings.

FIG. 1 is a simplified view of a communications network in accordance with an embodiment of the invention.

FIG. 2 shows the network of FIG. 1 with a second user.

FIG. 3 shows a process executed by a content distribution controller of FIG. 2.

FIG. 4 shows a signaling process executed in the network of FIG. 2.

FIG. 5 is a simplified view of a communications network in accordance with a second embodiment of the invention.

FIG. 6 shows the network of FIG. 5 with another user requesting the same content.

FIG. 7 is a simplified view of a communications network in accordance with a third embodiment of the invention.

FIG. 8 is a simplified view of a communications network in accordance with a fourth embodiment of the invention.

DETAILED DESCRIPTION OF THE PREFERRED EMBODIMENTS

With reference to FIG. 1, a communications network 9 or network domain comprises a user terminal 1, a signaling proxy 6, a content provider 3 and a content distribution controller 2. FIG. 1 shows schematically signaling flows for setting up a communications session between content provider 3 and user terminal 1 in order to distribute a streaming content to user terminal 1.

By way of illustration, the signaling protocol is SIP, which is defined in RFC 3261 of the Internet Engineering Task Force. FIG. 1 shows a signaling plane component, which is called a user agent UA in the context of SIP, and a transport plane component in both user terminal 1 and content provider 3. However, the separation between signaling plane and transport plane is only a logical separation.

Content provider 3 includes one or more servers connected to the network 9 to offer a content service to the general public or to a list of subscribers. Any type of content may be involved, e.g. live, on demand, audio, video, IPTV channels, IP radio channels, audioconference, Video on Demand and the like. The subscription and access control procedures to run such a service are well known to one skilled in the art. User terminal 1 runs an application to access the service. For example, the user is presented with an interface, e.g. a web page or other that makes it possible to select and request content in a list.

The content provider 3 allocates separate SIP uniform resource identifiers (URIs) for separate content channels. Within a content channel, there can be separate data streams, e.g. audio and video in different codecs and/or different levels of quality. In response to the user selecting content to be played, the user terminal 1 generates a SIP request known as INVITE. The INVITE 10 is sent to the URI of the selected content and comprises a description of the session.

The Session Description Protocol (SDP) (RFC 2327) serves to describe sessions. Its usage for constructing offers and answers is defined in RFC 3264. SIP with SDP uses an offer/answer model where one UA sends a session description, called the offer, which contains a proposed description of the session. The offer indicates the desired communications means (audio, video, games), parameters of those means (such as codec types) and addresses for receiving media from the answerer. The other UA responds with another session description, called the answer, which indicates which communications means are accepted, the parameters that apply to those means, and addresses for receiving media from the offerer. SDP makes it possible to use different IP addresses for each stream in a multimedia session.

Two exchanges between UAs are possible within the offer/answer model:
- the offer is in the SIP INVITE, and the answer in the OK or other SIP response,
- or the offer is in the OK or other SIP response, and the answer is in the SIP ACK.

Either the caller or callee can modify an existing session. This modification can involve changing addresses or ports, adding a media stream, deactivating a media stream, and so on. This is accomplished by sending a new INVITE request within the same dialog that established the session. An INVITE request sent within an existing dialog is known as a re-INVITE. For deactivation of a stream, the port number is set to 0.

The same offer-answer model that applies to session descriptions in INVITEs applies to re-INVITEs. The full description of the session, not just the change, is sent. When a UA receives a re-INVITE for an existing dialog, it checks the content of the session description to see if it has changed. If the session description has changed, the UAS adjusts the session parameters accordingly, possibly after asking the user for confirmation.

The Invite 10 is typically forwarded to the SIP proxy 6 that serves the domain of user terminal 1. Sip proxy 6 is configured to forward all the signaling messages, possibly after access control procedures outside the scope of this disclosure, to the content distribution controller 2, which is in charge of the network 9. In this embodiment, the content distribution controller 2 is implemented as a SIP back-to-back user agent (B2BUA), i.e. a SIP entity that can process a request that it receives as a user agent server (UAS). In order to determine how the request should be answered, it can also act as a user agent client (UAC) and generate requests. It maintains dialog state and participates in all requests sent on the dialogs it has established.

At this point, the B2BUA 2 creates a record in a session state information data storage 7 to store state information about the new invite 10. It also forwards the invite 10 to the Content provider 3. The SIP messages may go through additional SIP servers (not shown) depending on network topology, but the B2BUA 2 stays in the signaling path for the rest of the call. A SIP proxy is not required in all cases. In embodiments, user terminal 1 and content provider 3 could correspond directly with B2BUA 2.

If it accepts the request, possibly after access control procedures, the content provider 3 sends a SIP response OK 11 back to user terminal 1, which sends an ACK message 12 to complete the three-way SIP handshake. The OK 11 and ACK 12 follow the same path as the invite 10 and cause the content distribution controller 2 to record corresponding state information to keep an up-to-date view of the session.

Upon receiving the ACK 12, content provider 3 starts streaming the requested content data stream or streams 13 to the user terminal 1 using the session parameters that have been negotiated in the SDPs transported by the SIP messages 10, 11, 12. For example, a real-time protocol such as RTP, RTSP and RTCP may be used to transport the data stream 13.

The functions of content distribution controller 2 will now be explained with reference to FIGS. 2 to 4. In brief, the content distribution controller 2 monitors the existing sessions and new requests within the network or network domain 9, which it is in charge of. The content distribution controller 2 detects the occurrence of specific situations, which make it possible to optimize the distribution of a content stream to a plurality of network clients through at least one relay node. The optimization conditions include the fact that a given plurality of users are requesting the same data stream and the fact that the network locations of the given plurality of users make it efficient to have the data stream relayed by a given relay node. In embodiments, the given plurality of users must fulfill a proximity condition, e.g. being in the same city, subnet, wireless cell, or other predefined area. In response to those conditions being fulfilled, the content distribution controller 2 establishes communication sessions to have a single copy of the data stream being streamed to the relay node, from where several copies of the data stream can be sent to different users. Hence, the content distribution controller 2 acts to push the network load caused by N users consuming N identical or similar streams to the edge of the network (N an integer >1).

Referring to FIG. 2, the network 9 of FIG. 1 is shown again, with the SIP proxy being omitted. While the stream 13 is being continuously sent to user terminal 1, a second user terminal 4 requests the same content, e.g. the same TV channel. An Invite 15 is sent by user terminal 4 in the same manner as described above.

Upon receiving the Invite 15, the content distribution controller 2 executes the process shown on FIG. 3 to determine if the optimization conditions are fulfilled.

At step 20, the content distribution controller 2 creates a new record for storing the relevant parts of the Invite 15 in the session state information data storage.

At step 21, the parts of the Invite 15 that define the requested data stream are compared to the state information of existing sessions to detect if at least one existing session already includes the requested data stream. For example, if different SIP URIs are used for different channels, this step includes comparing the "To" field of the Invite 15 with the URIs involved in existing sessions. When the same SIP URI is found, the "m=" lines in the SDPs are also compared to detect if the codec used in the existing session matches the codec or codecs specified in the Invite 15. The existing session or sessions that include the requested data stream are selected and the process proceeds to step 22. In the example of FIG. 2, it is assumed that terminals 1 and 4 are requesting the same data stream.

At step 22, the parts of the Invite 15 that define the destination of the requested data stream are compared to the state information of the selected session or sessions to detect if at least one receiver of the data stream in the existing sessions is located close to user terminal 4. To compare the network locations of user terminal 4 with that of the receivers in the existing sessions, i.e. terminal 1 in the example shown, the process relies preferably on the destination IP addresses put in the "c=" lines in the SDPs. For example it is easy to detect that two IP addresses belong to a common IP subnet. It is also possible for the B2BUA 2 to detect that two IP addresses belong to close subnets by doing a Traceroute to both IP addresses or from prior knowledge of the network topology, especially in segments close to the relay nodes of network 9.

In FIG. 2, it is assumed that user terminals 1 and 4 are located in a common network segment 8, e.g. a subnet. When the requesting terminal 4 is found to belong to the same network segment as at least one network element that is already receiving the requested data stream, i.e. user terminal 1 in the example shown, the process selects the corresponding network element or elements and proceeds to step 23. In step 22, other information may be used as well, e.g. the "Contact" header of the end points in the SIP messages.

At step 23, a relay node is selected as a function of the network segment where the selected users are located, i.e. terminals 4 and 1 in the example shown, in order to relay the requested data stream from the content provider 3 to the users in an efficient manner.

In an embodiment, the selection step is based on prior knowledge of the content distribution controller 2 about the topology of the network segments and associations between respective relay nodes and respective network segments. For example, the operator network 9 is divided in several segments, each segment including a subnet or collection of subnets, and a plurality of relay nodes are installed in the network. Each relay node operates in a specific network segment and has its own IP address within that segment. Corresponding topology data is stored in a relay registry for use by the content distribution controller 2. In the example shown, relay node 5 operates in network segment 8 where terminals 1 and 4 are located, so relay node 5 is selected. In other embodiments, content distribution controller 2 determines which relay node to use through a dynamic discovery or subscription mechanism. In other embodiments, the selection of a relay node may be fixedly set, i.e. a content distribution controller 2 is fixedly configured to use a given relay node.

Steps 21 to 23 serve to determine that the requested data stream can be sent to a plurality of users from a given relay node. These steps can be performed in a different order. In a modified embodiment, the network segment of the requesting client is determined, then the relay node operating in that segment is selected, and then step 22 is performed to detect if receivers of the data stream in existing sessions are located in that segment.

From step 23, if the optimization conditions are fulfilled, the process goes to step 24 to trigger the set up of sessions with the selected relay node. In the example shown, the conditions are fulfilled after two users, namely terminals 1 and 4, request the same stream.

However it is a simple matter of configuration to define how many users are required before the relay node is used. After step 21 22 or 23, if the number of users that would be served by the relay node is too low, the process goes to step 25. From step 25, the same process as that described in respect of terminal 1 can be executed to generate an independent data stream between content provider 3 and user terminal 4.

At step 24, the content distribution controller 2 initiates signaling flows to redirect the distribution of the requested data stream to the selected users through the selected relay node. In the example of FIG. 2, the data stream is distributed from content provider 3 to relay node 5, and re-sent by relay node 5 to terminals 1 and 4 on behalf of the content provider 3, as shown by thick arrows 31, 37 and 38. SIP signaling can be used in different manners to set up those sessions. Of course relay nodes have to be registered in the SIP registrar in the home SIP server. FIG. 4 shows an illustrative implementation of the signaling flows. The ACK messages are omitted.

At step 30, the content distribution controller 2 sets up a new session with the content provider 3 to stream the requested data to the relay node 5. An Invite is sent to the content provider 3 with the relay node address as destination IP address in the SDP. Optionally, a multicast address could be used as destination address if content provider 3 and the network support IP multicast. Arrow 31 represents the data stream.

At step 32, the content distribution controller 2 sets up new sessions with the relay node 5 to stream the requested data to user terminals 1 and 4. A single session is sufficient if IP multicast can be used between the relay node 5 and user terminals 1 and 4. Hence, an Invite is sent to relay node 5 with the content provider 3 as source IP address and the user terminals 1 and 4 as unicast destination IP addresses, or with a multicast address as both source and destination IP address, due to current limitations of multicast support in the SIP offer-answer model.

At step 33, the content distribution controller 2 modifies the SDP between the content provider 3 and the user terminal 1 to have user terminal 1 receive the data stream from the relay node 5 instead of the content provider 3. Hence, a Re-Invite is sent to user terminal 1 with a modified SDP.

At step 34, the content distribution controller 2 modifies the SDP sent by the user terminal 4 and send the modified SDP back to the user terminal 4 to also have user terminal 4 receive the data stream from the relay node 5 instead of the content provider 3. Then the relay node 5 starts streaming the data to the user terminals. Arrow 37 and 38 represent the data streams.

At step 36, the content distribution controller 2 terminates the initial data stream 13 from the content provider 3. In this step, a Re-Invite is sent to content provider 3, e.g. with a line "a=inactive" in the SDP. There is no interruption of service for user terminal 1, since it has already changed from the data stream 13 to the data stream 37 at step 33. In order to smoothen the transition from one stream to the other, it is possible to specify a start-time in the SDP sent in step 33, using a "t=" line.

In FIG. 4, the ordering of the steps has been arranged to do Make-before-Break for user terminal 1, i.e. step 36 is performed later than step 33. However, some steps could be performed in a different order.

In the above description of step 21 in FIG. 3, it has been assumed that user terminal 4 requested the data stream in the same codec as the codec used in the existing session, i.e. the codec of the data stream 13. Then, that same codec can be kept for all the sessions set up in FIG. 4. However, this is not strictly necessary for performing the optimized distribution through relay node 5. Hence, in a modified embodiment, the comparison criteria in step 21 can be broadened. When user terminal 4 request the same content, i.e. same content URI, with a different codec from that used for data stream 13, there is still a possibility for content distribution controller 2 to review the initial offer sent by user terminal 1 in Invite 10 in order to find a codec that matches the offer sent by user terminal 4. Then the content distribution controller 2 can impose the matching codec in the sessions set up in FIG. 4, even though it may be a different codec from that used in the existing session.

In another modified embodiment, the relay node 5 has a capability to transcode the data stream between different codecs. Then, the content distribution controller 2 uses the signaling flows of FIG. 4 to negotiate on behalf of the endpoints appropriate codecs to be used upstream of the relay node and downstream of the relay node. Hence different codecs could be used for data streams 31, 37 and 38. For example, the content distribution controller 2 uses a SIP OPTION message to request the codecs supported by the relay node before setting up the sessions.

In another modified embodiment, the relay node 5 and the network between the relay node 5 and the user terminals 1 and 4 supports a broadcast transport method, e.g. DVB-H or MediaFlo or MBMS (in a UMTS network). Then the sessions can be set up in broadcast mode at steps 32 to 34. If the relay node 5 supports several transport methods, the decision to select one transport method can be based on several criteria, e.g. the network locations and number of receivers, and the efficiency or cost of multicast or broadcast versus unicast per network segment.

In another modified embodiment, a Peer-to-Peer technique is used between the relay node 5 and the user terminals 1 and 4. Hence the relay node operates as a Peer-to-Peer super node.

As shown by arrows 39 on FIG. 4, it is possible to keep the content provider 3 in the signaling path of all sessions, e.g.

using a SIP Route Set header field, in order to keep the content provider 3 informed of each recipient of the content. However, this is not necessary. In embodiments, the content provider is not kept informed of individual listeners, e.g. for scalability reasons.

For the sake of simplicity, the example that has been described above involves only two end users and a single relay node. However, the same process can be used to distribute the data stream to any number of end users through one or more relay nodes. Different relay nodes located in different network segments can be involved to serve different set of users located in the respective segments. When a large number of users are involved, if the time needed to detect the possibilities of optimization is long, it is possible to respond to a new request by setting up at first a new session directly between the requesting client and the data source, i.e.; without using relay nodes, and then to modify that session once the possibilities of optimization have been detected and the relevant relay nodes selected.

In embodiments, the same process is applied multiple times by treating a first relay node as a content provider for a second relay node serving a different segment in the same network or in another network. An embodiment of this type will now be described in reference to FIGS. 5 and 6.

FIG. 5 shows the network 9 of FIG. 2 interconnected to another network 109. In network 109, the elements that have a similar function to the elements of network 9 are given the same reference numerals increased by 100. A content distribution controller 102 is in charge of the network 109. A SIP proxy 106 is configured to pass all the signaling flows to the content distribution controller 102, possibly after access control procedures.

At step 40, at a later point in time, a user terminal 101 requests the same content stream to the content provider 3. An Invite is sent to the content provider 3 via SIP proxy 106, content distribution controller 102, SIP proxy 6 and content distribution controller 2. Due to the network location of user terminal 101, content distribution controller 2 detects that the data stream 31 already sent to relay node 5 could be reused for user terminal 101. For example, content distribution controller 2 knows by configuration that the whole network 109 is attributed to relay node 5 since the segment of relay node 5 comprises the border router between networks 9 and 109. Alternatively, the content distribution controller 2 determines that user terminal 101 is closer to relay node 5 than to content provider 3, e.g. by computing the number of network hops in each case.

At step 41, the content distribution controller 2 modifies the SDP in the Invite received from terminal 101 and in the OK sent back by the content provider 3, in order to also have terminal 101 receive the data stream from relay node 5 instead of content provider 3.

At step 42, the content distribution controller 2 sets up a new session with relay node 5 to send the data stream to terminal 101. However, this may not be necessary if the relay node 5 is already multicasting the stream. Then the same multicast address can be used as destination IP address for all three terminals.

At step 43, the relay node 5 starts streaming the content to user terminal 101.

Referring to FIG. 6, at a later point in time, a user terminal 104 requests the same content stream to the content provider 3. At step 45, user terminal 104 sends an Invite to content provider 3 via SIP proxy 106, content distribution controller 102, SIP proxy 6 and content distribution controller 2. At this stage, the content distribution controller 102 already knows from the Invite sent by user terminal 101 (step 40) and from the OK sent by the content distribution controller 2 on behalf of the content provider 3 (step 41) that user terminal 101 is receiving the data stream from relay node 5 and which codecs are used. Due to the network location of user terminal 104, content distribution controller 102 detects that the relay node 105 can serve to distribute the data stream to both terminals 101 and 104. For example, content distribution controller 102 detects that both terminals 101 and 104 are located in the segment of network 109, which is attributed to relay node 105.

At step 46, content distribution controller 102 uses SIP signaling to set up a new session with relay node 5 to stream the requested content to relay node 105.

At step 47, content distribution controller 102 uses SIP signaling to set up new sessions with relay node 105 to stream the requested content to both terminals 101 and 104. Only one session is necessary if relay node 105 can multicast the data stream.

At step 48, content distribution controller 102 uses SIP signaling to modify the SDP between content provider 3 and user terminal 101 in order to have user terminal 101 receive the data stream from relay node 105 instead of relay node 5.

At step 49, content distribution controller 102 uses SIP signaling to modify the SDP in the Invite received from terminal 104 to also have terminal 104 receive the data stream from relay node 105 instead of content provider 3. At step 50, the relay node 105 starts streaming the content to user terminals 101 and 104.

At any time, an individual user can leave the call without affecting the other users. In that case, the user sends a BYE to the content provider. Upon receiving the BYE, the content distribution controllers can inform the corresponding relay nodes to drop the requesting user.

In embodiments, the above-described processes can be implemented in an IP Multimedia Subsystem (IMS) architecture. IMS is an architecture that promotes fixed-mobile convergence by merging the applications and capabilities of the Internet with both wireless and wireline telephony. IMS enables multimedia applications (both voice and video) to be used through multiple forms of access, including third generation (3G) wireless devices such as mobile phones and personal digital assistants (PDAs), as well as through traditional Internet access methods, including corporate local-area networks (LANs) and broadband connections. IMS is built for the purpose of removing any dependence of service delivery from the physical network itself, aside from the obvious physical constraints of bandwidth. A layered approach allows IMS to provide an access-independent service delivery mechanism The three main layers of IMS are the transport layer, the control layer, and the service layer. A simplified overview of some of the main functions of IMS is given below.

The transport layer may comprise many types of access networks. Some examples of packet-based networks are general packet radio service (GPRS), Universal Mobile Telecommunications System (UMTS), code division multiple access 2000 (CDMA2000), wireless local-area networks (WLANs), PacketCable, and asynchronous digital subscriber line (ADSL). Users are connected to the IMS infrastructure through the transport layer, either directly through an IMS terminal (such as a 3G wireless handset) or through a non-IMS device, e.g. the traditional public switched telephone network (PSTN), that interfaces the IMS infrastructure through a gateway, i.e. a device that provides interworking between legacy networking functions and IMS.

The control layer is the functional area in IMS that provides all of the session and call control. The call session control function (CSCF) is the central routing engine and policy enforcement point for the network and uses session initiation protocol (SIP) for call control. The home subscriber server (HSS) is also found in the control layer. The HSS is a centralized database that contains all the pertinent user information such as home network location, security information, and user profile information (including the services for which the user has subscribed and may therefore participate in).

The service layer is where the application server (AS) resides. This is where all of the services are delivered through the IMS interface to the control layer through standardized protocols, primarily SIP.

An embodiment of this type will now be described with reference to FIG. 7. In FIG. 7, the elements having a similar function to those of FIGS. 5 and 6 are given the same reference numerals.

FIG. 7 shows two operator networks, an all-IP network 9 with IMS core 51 on the left and an UMTS network 109 with IMS core 52 on the right. Both operator networks have an application server 2, respectively 102 in their IMS core, and at least one relay node 5, respectively 105 in the transport layer. The application servers 2 and 102 each operate as a content distribution controller as described above, which gets the SIP signaling forwarded from a SIP server 6, respectively 106, namely the S-CSCF in IMS. FIG. 7 shows the situation where three terminals 1, 101 and 104 receive the same real-time video stream in an optimized manner while receiving a personalized audio stream directly from a content provider. Terminal 1 receives the video stream multicasted or unicasted by relay node 5. Terminals 101 and 104 receive the video stream multicasted or unicasted by relay node 105 that receives the video stream multicasted or unicasted from relay node 5.

The dashed lines show logical links between the components and do not limit the physical implementation of those links. A tag on each link mentions one or more protocols that can be used on the link. For example, SIP is used for session control, DIAMETER or RADIUS for database access and COPS or DIAMETER for Quality of Service enforcement. The following acronyms are used: PDF for Policy Decision Function, PEP for Policy Enforcement Point, RNC for Radio Network Controller, SGSN for Serving GPRS Support Node, GGSN for Gateway GPRS Support Node, BM-SC for Broadcast Multicast Service Center, COPS for Common Open Policy Service and RADIUS for Remote Authentication Dial In User Service FIG. 7 shows the SDPs involved in the multimedia sessions at the terminals, relay nodes and the content provider 3. These SDPs were made dynamically by both application servers 2 and 102 while more clients requested the same video stream, e.g. using the processes described in reference to FIGS. 5 and 6. Since the application servers 2 and 102 are B2BUAs in the SIP signaling stream, relay node 5 has an SDP for both the relay node 105 and the content provider 3 side and the content provider 3 has an SDP for both relay node 5 and the terminal 1 side. In the SDPs, the following conventions are used:

- "Video" and "audio" denote the media type, i.e. in the "m=" lines.
- CP, RA1, RA2, UE1, UE2 and UE3 denote IP unicast addresses for content provider 3, relay node 5, relay node 105, terminal 1, terminal 101 and terminal 104 respectively, i.e. in the "c=" lines.
- MA1 and MA2 denote IP multicast addresses used in network 9 and network 109 respectively, i.e. in the "c=" lines.
- "x|y" means "x or y".
- "←" denotes "sendonly" and "→" denotes "recvonly", i.e. in the "a=" lines.

In a preferred embodiment, the application servers 2 and 102 are IMS Application Servers for converging multimedia and broadcast (MBC-AS) that enable switching a stream from unicast to IP multicast when this is both useful and supported in a network segment. Dynamic changes of streams from unicast to multicast and vice-versa can be supported with SIP re-INVITE messages. Furthermore, the MBC-AS can potentially utilise all network paths through which a multihomed terminal is reachable in order to optimize bandwidth and latency in a combination of network segments. In embodiments, the BM-SC can also make local decisions to use unicast or MBMS to the terminals, or be instructed to do so by the MBC-AS.

An MBC-AS can be available in different network segments to make network segment-specific decisions while content streams become more popular and as such control the content distribution enabled by the relays.

Since unicasted and multicasted streams from different sources can be combined in multimedia sessions, personalisation and interactivity can be supported in individual streams in combination with shared streams. The application servers 2 and 102 can also allow reducing the signaling to the content provider. E.g. when a relay node is already in place, the application server can handle directly a new INVITE from a user instead of forwarding it to the content provider. Thus, the content provider 3 does not need to handle a control session for each endpoint.

In a modified embodiment, the application servers 2 and 102 support enhancements of IP multicast in the answer/offer model for SIP to allow signaling between multicast senders and multicast receivers and vice-versa, as outlined in Internet draft "Requirements for group sessions using multicast", draft-bijwaard-sipping-multicast-requirements-00, D. Bijwaard, August 2007.

With the described SIP controlled content distribution techniques, IP multicast does not need to be enabled in all routers or endpoints. Optionally, different multicast addresses can be used in different network segments. The more popular a channel is, the more efficiency can be gained near the end points using the described distribution techniques.

The above described embodiments refer mostly to the distribution of a real-time content using SIP-enabled relay nodes, i.e. the assumption is made that user terminals 1 and 4 are receiving the same portion of the content stream at substantially the same instant in time. In embodiments adapted to non-real-time contents, e.g. applicable to Video on Demand, the relay nodes are also used as proxy servers for caching the content stream, so as to distribute it in a non-synchronized manner to different users of different points in time. An embodiment of this type will now be described with reference to FIG. 8.

In FIG. 8, the elements identical or similar to those of FIG. 2 have the same reference numeral. In this embodiment, the content distribution controller 2 decides to involve the relay node 5 already for relaying the initial data stream 13 to the user terminal 1. This decision can be based on the predicted or inferred popularity of the content initially requested by user terminal 1. Hence, in response to the Invite 10 from user terminal 1, the content distribution controller 2 uses SIP signaling to set up a first session between content provider 3 and relay node 5 and a second session between relay node 5 and user terminal 1. While streaming the content stream to user terminal 1, relay node 5 also caches the content stream in local data storage 60. The content stream may be cached for a limited amount of time, e.g. for the duration of the session of user terminal 1 or for the duration of a second or later session involving the same content, if any.

At a later point in time, e.g. when user terminal 1 has already received half of the requested movie or audio program, the same content is requested by user terminal 4. Using a similar process to that described in FIG. 3, the content distribution controller 2 detects that the content stream 13 received and cached by relay node 5 can be re-used in response to the Invite 15 of terminal 4. The content distribution controller 2 performs signaling similar to that described in step 34 of FIG. 4 in order to set up a new session between relay node 5 and user terminal 4 on behalf of content provider 3. By contrast with FIG. 2, the data stream 138 that is sent to user terminal 4 is offset in time with respect to the data stream received by user terminal 1, i.e. user terminal 4 receives at first the portion of the data stream corresponding to the beginning of the program, which was cached in data storage 60. This cache access could be triggered in view of the requested URI or content provider, which would be known to provide offline content. At the same time, user terminal 1 may be playing the end portion of the program. By contrast with FIG. 4, the content distribution controller 2 does not need to modify the session of user terminal 1 in this case.

Alternatively, instead of caching by default for future sessions, the relay node can also start caching when a second user (after a given number of users) requests the same content. The relay node would then fill the head of the cache while the second user gets its content directly from the content provider and then use the cached data when getting to the timestamp of the request of the second user. In other words, the relay node first downloads the head of the stream directly from the content provider with specified duration in SDP and then reads from the cache.

Thus, in embodiments, the relay nodes are also used as proxy servers for proxying multimedia streams (e.g. for non-real-time content) and/or as adaptation nodes for transcoding data streams (e.g. in a terminal-specific manner) in the transport layer near the endpoints.

Although the above embodiments refer mostly to SIP, other signaling protocols can be used to implement similar processes and functions, e.g. HTTP or H323. For HTTP, the functions of the content distribution controller can be implemented in a web proxy. For H323, the functions of the content distribution controller can be implemented in a media gateway controller or session border controller, while a media gateway or Multipoint Control Units can play the role of relay nodes. In other embodiments, a content distribution controller and a relay node could be integrated in a single device, e.g. the residential gateway or xDSL modem of a home network in order to distribute content streams to connected devices in the home.

In all cases, a benefit of the described content distribution techniques is to reduce the overhead of sending a content stream separately to multiple similar destinations. Bandwidth benefits can be achieved for both the sender of the content and any router located in the path to the receivers.

The invention is not limited to the described embodiments. The appended claims are to be construed as embodying all modification and alternative constructions that may be occurred to one skilled in the art, which fairly fall within the basic teaching here, set forth.

The use of the verb "to comprise" or "to include" and its conjugations does not exclude the presence of elements or steps other than those stated in a claim. Furthermore, the use of the article "a" or "an" preceding an element or step does not exclude the presence of a plurality of such elements or steps.

The invention may be implemented by means of hardware as well as software. The same item of hardware may represent several <<means>>.

In the claims, any reference signs placed between parentheses shall not be construed as limiting the scope of the claims.

The invention claimed is:

1. A method for controlling distribution of a shared content stream in a communications network, comprising:
   storing session state information about existing communication sessions within the network,
   receiving a request for transmission of a content stream to a requesting network client,
   determining that an existing session includes the requested content stream,
   determining that a receiver of said content stream in said existing session has a network location correlated with a network location of the requesting network client,
   selecting a relay network element capable of servicing said correlated network locations among a plurality of relay network elements associated to respective segments of the network,
   caching the content stream at the relay network element,
   setting up unicast communications sessions between the relay network element and each of the requesting network client and the receiver of the existing session for streaming said requested content stream to both the requesting network client and said receiver of the content stream in the existing session through the relay network element, wherein the relay network element streams the requested content stream in a time-offset manner to the requesting network client and the receiver of the existing session.

2. The method in accordance with claim 1, further comprising:
   modifying the existing session to have said receiver receive the content stream from the relay network element.

3. The method in accordance with claim 1, further comprising:
   transcoding the requested content stream at the relay network element.

4. The method in accordance with claim 1, wherein a multicast communications session is set up between the relay network element and both the requesting network client and the receiver of the existing session.

5. The method in accordance with claim 1, wherein a broadcast communications session is set up between the relay network element and both the requesting network client and the receiver of the existing session.

6. The method in accordance with claim 1, further comprising:
   selecting a transport protocol in a group of transport protocols supported by the network, said group comprising a unicast transport protocol and at least one of a multicast transport protocol and a broadcast transport protocol, said transport protocol being selected for streaming the requested content stream between the relay network element and both the requesting network client and the receiver of the existing session.

7. The method in accordance with claim 1, wherein the Session Initiation Protocol is used for setting up the communication sessions.

8. The method in accordance with claim 1, further comprising
   determining that the requesting network client and the receiver of the existing session belong to a common IP subnet of said network.

9. The method in accordance with claim 1, further comprising:
determining that the requesting network client and the receiver of the existing session are at a short distance one from the other.

10. The method in accordance with claim 1, further comprising:
determining that the requesting network client and the receiver of the existing session are wireless terminals located in a common cell of a wireless system.

11. The method in accordance with claim 1, further comprising:
detecting a common URI associated to said content stream in both the request and the session state information of existing communication sessions.

12. The method in accordance with claim 1, further comprising:
detecting a common media description parameter associated to said content stream in both the request and the session state information of existing communication sessions.

13. The method in accordance with claim 1, further comprising:
retrieving the identity of the relay network element capable of servicing said correlated network locations from a stored relay registry.

14. The method in accordance with claim 1, further comprising:
negotiating a codec for streaming said content stream from the relay network element to the requesting network client.

15. The method in accordance with claim 1, wherein communication sessions are set up with multiple relay network elements to relay the content stream to multiple groups of network clients.

16. A streaming content distribution controller for a communications network comprises:
storage means for storing session state information about existing communication sessions within the network,
an interface for receiving a request for content from a network client, content correlation means for identifying an existing session having a content stream correlated with a requested content stream,
network location correlation means for identifying a destination of said content stream in said existing session having a network location correlated with a network location of the requesting network client,
relay determination means for selecting a relay network element capable of servicing said correlated network locations among a plurality of relay network elements associated to respective segments of the network,
caching means for caching the content stream at the relay network element, and
signaling means for setting up unicast communications sessions between the relay network element and each of the requesting network client and the destination of the existing session for streaming said requested content stream to both the requesting network client and said destination of the existing session through the relay network element, wherein the relay network element streams the requested content stream in a time-offset manner to the requesting network client and the destination of the existing session.

17. The streaming content distribution controller in accordance with claim 16, wherein the signaling means use the Session Initiation Protocol.

18. The streaming content distribution controller in accordance with claim 16, wherein the network location correlation means is capable of determining that the requesting network client and the receiver of the existing session belong to a common segment of said network.

19. The streaming content distribution controller in accordance with claim 16, wherein the relay determination means comprises a data storage including configuration information that associates each of a plurality of relay network elements to a respective segment of the network.

20. The streaming content distribution controller in accordance with claim 16, wherein the content correlation means is capable of detecting a URI associated to said content stream in both the request and the session state information of existing communication sessions.

21. The streaming content distribution controller in accordance with claim 16, wherein the content correlation means is capable of detecting a media description parameter associated to said content stream in both the request and the session state information of existing communication sessions.

22. A communications network, comprising:
a content distribution controller in accordance with claim 16, and
a plurality of relay network elements for servicing respective segments of said network.

23. The communications network in accordance with claim 22, further comprising:
at least one signaling proxy server configured to direct requests originating from clients of said communications network to the content distribution controller.

24. The communications network in accordance with claim 22, having an IP Multimedia Subsystem architecture.

25. The communications network in accordance with claim 22, comprising a plurality of content distribution controllers in charge of different administrative domains of said network, wherein the signaling means use the Session Initiation Protocol.

* * * * *